US012812166B2

(12) United States Patent
Lin et al.

(10) Patent No.: US 12,812,166 B2
(45) Date of Patent: Nov. 24, 2026

(54) METHOD AND APPARATUS OF OVERLAPPED BLOCK MOTION COMPENSATION IN VIDEO CODING SYSTEM

(71) Applicant: MEDIATEK INC., Hsinchu City (TW)

(72) Inventors: Yu-Cheng Lin, Hsinchu City (TW); Chun-Chia Chen, Hsinchu City (TW); Tzu-Der Chuang, Hsinchu City (TW); Chih-Wei Hsu, Hsinchu City (TW); Ching-Yeh Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/181,858

(22) Filed: Mar. 10, 2023

(65) Prior Publication Data

US 2023/0328278 A1 Oct. 12, 2023

Related U.S. Application Data

(60) Provisional application No. 63/329,509, filed on Apr. 11, 2022.

(51) Int. Cl.
*H04N 19/583* (2014.01)
*H04N 19/105* (2014.01)
*H04N 19/176* (2014.01)

(52) U.S. Cl.
CPC ......... *H04N 19/583* (2014.11); *H04N 19/105* (2014.11); *H04N 19/176* (2014.11)

(58) Field of Classification Search
CPC ... H04N 19/105; H04N 19/176; H04N 19/583
(Continued)

(56) References Cited

U.S. PATENT DOCUMENTS

| | | | |
|---|---|---|---|
| 11,695,953 B2 | 7/2023 | Lin et al. | |
| 2019/0320203 A1* | 10/2019 | Chiang | H04N 19/132 |

(Continued)

FOREIGN PATENT DOCUMENTS

| | | |
|---|---|---|
| CN | 110620930 A | 12/2019 |
| CN | 110858908 A | 3/2020 |

(Continued)

OTHER PUBLICATIONS

Chinese language office action dated Nov. 17, 2023, issued in application No. TW 112113465.

*Primary Examiner* — Behrooz M Senfi
(74) *Attorney, Agent, or Firm* — McClure, Qualey & Rodack, LLP

(57) ABSTRACT

A method and apparatus for Overlapped Boundary Motion Compensation (OBMC) are provided. According to the method, input data associated with a current block is received, wherein the input data includes pixel data for the current block to be encoded at an encoder side or coded data associated with the current block to be decoded at a decoder side. An inter prediction tool from a set of inter-prediction coding tools is determined for the current block. An OBMC subblock size for the current block is determined based on information related to the inter prediction tool selected for the current block or the inter prediction tool of a neighboring block. Subblock OBMC is applied to a subblock boundary between a neighboring subblock and a current subblock of the current block according to the OBMC subblock size.

11 Claims, 10 Drawing Sheets

(58) Field of Classification Search
USPC ...................................................... 375/240.12
See application file for complete search history.

(56) References Cited

U.S. PATENT DOCUMENTS

| | | | | |
|---|---|---|---|---|
| 2020/0021845 | A1 | 1/2020 | Lin | |
| 2021/0235073 | A1* | 7/2021 | Liu ...................... | H04N 19/176 |
| 2022/0353508 | A1 | 11/2022 | Chuang et al. | |
| 2024/0297982 | A1* | 9/2024 | Deng ................... | H04N 19/583 |
| 2024/0380903 | A1* | 11/2024 | Deng ................... | H04N 19/176 |
| 2025/0039400 | A1* | 1/2025 | Kim ..................... | H04N 19/132 |

FOREIGN PATENT DOCUMENTS

| | | | | | |
|---|---|---|---|---|---|
| CN | 113841398 | A | | 12/2021 | |
| CN | 116601959 | A | * | 8/2023 | ............. H04N 19/70 |
| KR | 20240065097 | A | * | 5/2024 | ........... H04N 19/159 |
| TW | 202007167 | A | * | 2/2020 | ........... H04N 19/577 |
| TW | 202123702 | A | | 6/2021 | |
| TW | I897471 | B | * | 9/2025 | ....... H04N 21/44004 |
| WO | WO-2019067879 | A1 | * | 4/2019 | ........... H04N 19/176 |
| WO | WO-2022140724 | A1 | * | 6/2022 | ........... H04N 19/573 |
| WO | WO-2023137414 | A2 | * | 7/2023 | ........... H04N 19/577 |

* cited by examiner

METHOD AND APPARATUS OF OVERLAPPED BLOCK MOTION COMPENSATION IN VIDEO CODING SYSTEM

CROSS REFERENCE TO RELATED APPLICATIONS

The present invention is a non-Provisional application of and claims priority to U.S. Provisional Patent Application No. 63/329,509, filed on Apr. 11, 2022. The U.S. Provisional Patent Application is hereby incorporated by reference in its entirety.

FIELD OF THE INVENTION

The present invention relates to video coding system. In particular, the present invention relates to OBMC (Overlapped Block Motion Compensation) in a video coding system that uses various inter prediction coding tools with subblock processing.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video encoding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. Furthermore, various new coding tools have been proposed for consideration in the development of a new coding standard beyond the VVC. Among various new coding tools, the present invention provides some proposed methods to improve some of these coding tools.

BRIEF SUMMARY OF THE INVENTION

A method and apparatus for video coding are disclosed. According to the method, input data associated with a current block is received, wherein the input data comprise pixel data for the current block to be encoded at an encoder side or coded data associated with the current block to be decoded at a decoder side. An inter prediction tool from a set of inter-prediction coding tools is determined for the current block. An OBMC (Overlapped Boundary Motion Compensation) subblock size for the current block is determined based on information related to the inter prediction tool selected for the current block or the inter prediction tool of a neighboring block. Subblock OBMC is applied to a subblock boundary between a neighboring subblock and a current subblock of the current block according to the OBMC subblock size.

In one embodiment, the OBMC subblock size is dependent on a smallest processing unit associated with the inter prediction tool selected for the current block.

In one embodiment, the inter prediction tool selected for the current block corresponds to a DMVR mode. For example, the OBMC subblock size is set to 8×8 if the inter prediction tool selected for the current block corresponds to the DMVR mode, and the OBMC subblock size is set to 4×4 if the inter prediction tool selected for the current block corresponds to an inter prediction tool other than the DMVR mode.

In one embodiment, the inter prediction tool selected for the current block corresponds to an affine mode. For example, the OBMC subblock size is set to 4×4 if the inter prediction tool selected for the current block corresponds to an affine mode, and the OBMC subblock size is set to include size 8×8 if the inter prediction tool selected for the current block corresponds to an inter prediction tool other than the affine mode.

In one embodiment, the inter prediction tool selected for the current block corresponds to an SbTMVP (Subblock-based Temporal Motion Vector Prediction) mode. For example, the OBMC subblock size is set to 4×4 if the inter prediction tool selected for the current block corresponds to an SbTMVP mode, and the OBMC subblock size is set to include size 8×8 if the inter prediction tool selected for the current block corresponds to an inter prediction tool other than the SbTMVP.

In one embodiment, the OBMC subblock size is set to 8×8 if the inter prediction tool selected for the current block corresponds to a DMVR mode, and the OBMC subblock size is set to 4×4 if the inter prediction tool selected for the current block corresponds to an affine more or an SbTMVP mode.

In one embodiment, the inter prediction tool selected for the current block corresponds to a GPM (Geometric Partition Mode).

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Overlapped Block Motion Compensation (OBMC)

Overlapped Block Motion Compensation (OBMC) is to find a Linear Minimum Mean Squared Error (LMMSE) estimate of a pixel intensity value based on motion-compensated signals derived from its nearby block motion vectors (MVs). From estimation-theoretic perspective, these MVs are regarded as different plausible hypotheses for its true motion, and to maximize coding efficiency, their weights should minimize the mean squared prediction error subject to the unit-gain constraint.

When High Efficient Video Coding (HEVC) was developed, several proposals were made using OBMC to provide coding gain. Some of them are described as follows.

Figure 2:
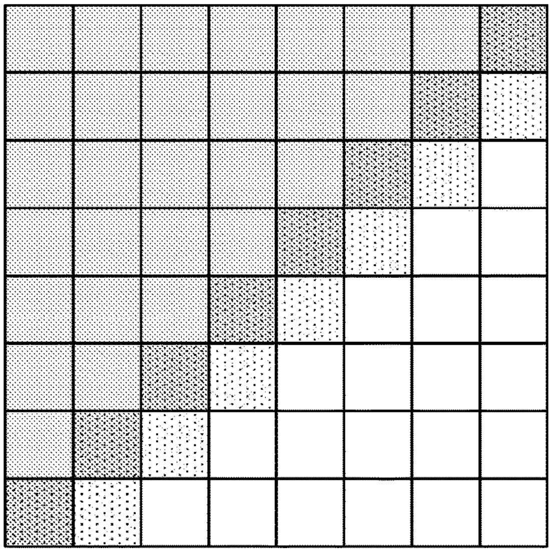
FIG. 2 illustrates an example of overlapped motion compensation for geometry partitions.

In JCTVC-C251 (Peisong Chen, et. al., "Overlapped block motion compensation in TMuC", Joint Collaborative Team on Video Coding (JCT-VC) of ITU-T SG16 WP3 and ISO/IEC JTC1/SC29/WG11, 3rd Meeting: Guangzhou, CN, 7-15 Oct. 2010, Document: JCTVC-C251), OBMC was applied to geometry partition. In geometry partition, it is very likely that a transform block contains pixels belonging to different partitions. In geometry partition, since two different motion vectors are used for motion compensation, the pixels at the partition boundary may have large discontinuities that can produce visual artifacts similar to blockiness. This in turn decreases the transform efficiency. Let the two regions created by a geometry partition be denoted by region 1 and region 2. A pixel from region 1 (2) is defined to be a boundary pixel if any of its four connected neighbors (left, top, right, and bottom) belongs to region 2 (1). FIG. 2 shows an example where grey-dotted pixels belong to the boundary of region 1 (grey region) and white-dotted pixels belong to the boundary of region 2 (white region). If a pixel is a boundary pixel, the motion compensation is performed using a weighted sum of the motion predictions from the two motion vectors. The weights are ¾ for the prediction using the motion vector of the region containing the boundary pixel and ¼ for the prediction using the motion vector of the other region. The overlapping boundaries improve the visual quality of the reconstructed video while also providing BD-rate gain.

In JCTVC-F299 (Liwei Guo, et. al., "CE2: Overlapped Block Motion Compensation for 2N×N and N×2N Motion Partitions", Joint Collaborative Team on Video Coding (JCT-VC) of ITU-T SG16 WP3 and ISO/IEC JTC1/SC29/WG11, 6th Meeting: Torino, 14-22 Jul. 2011, Document: JCTVC-F299), OBMC was applied to symmetrical motion partitions. If a coding unit (CU) is partitioned into 2 2N×N or N×2N prediction units (PUs), OBMC is applied to the horizontal boundary of the two 2N×N prediction blocks, and the vertical boundary of the two N×2N prediction blocks. Since those partitions may have different motion vectors, the pixels at partition boundaries may have large discontinuities, which may generate visual artifacts and also reduce the transform/coding efficiency. In JCTVC-F299, OBMC is introduced to smooth the boundaries of motion partition.

Figure 3A:
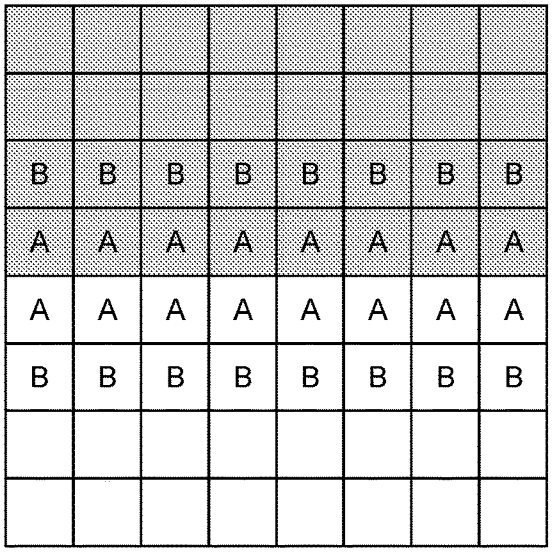
FIG. 3A and FIG. 3B illustrate an example of OBMC for 2N×N (FIG. 3A) and N×2N blocks (FIG. 3B).
Figure 3B:
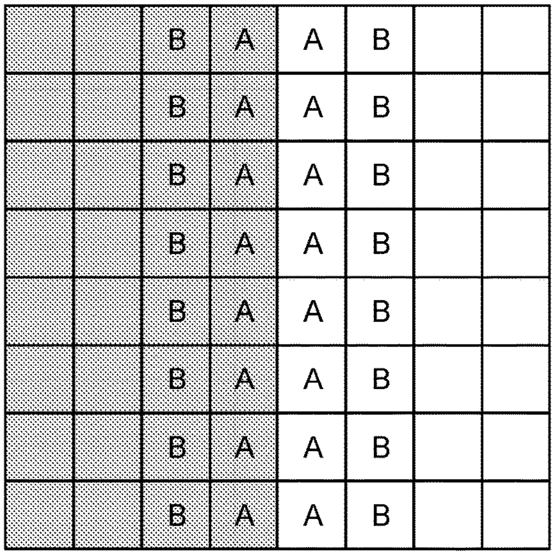

FIGS. 3A-B illustrate an example of OBMC for 2N×N (FIG. 3A) and N×2N blocks (FIG. 3B). The gray pixels are pixels belonging to Partition 0 and white pixels are pixels belonging to Partition 1. The overlapped region in the luma component is defined as 2 rows (columns) of pixels on each side of the horizontal (vertical) boundary. For pixels which are 1 row (column) apart from the partition boundary, i.e., pixels labeled as A in FIGS. 3A-B, OBMC weighting factors are (¾, ¼). For pixels which are 2 rows (columns) apart from the partition boundary, i.e., pixels labeled as B in FIGS. 3A-B, OBMC weighting factors are (⅞, ⅛). For chroma components, the overlapped region is defined as 1 row (column) of pixels on each side of the horizontal (vertical) boundary, and the weighting factors are (¾, ¼).

Currently, the OBMC is performed after normal MC, and BIO is also applied in these two MC processes, separately. That is, the MC results for the overlapped region between two CUs or PUs is generated by another process not in the normal MC process. BIO (Bi-Directional Optical Flow) is then applied to refine these two MC results. This can help to skip the redundant OBMC and BIO processes, when two neighboring MVs are the same. However, the required bandwidth and MC operations for the overlapped region is increased compared to integrating OBMC process into the normal MC process. For example, the current PU size is 16×8, the overlapped region is 16×2, and the interpolation filter in MC is 8-tap. If the OBMC is performed after normal MC, then we need (16+7)×(8+7)+(16+7)×(2+7)=552 reference pixels per reference list for the current PU and the related OBMC. If the OBMC operations are combined with normal MC into one stage, then only (16+7)×(8+2+7)=391 reference pixels per reference list for the current PU and the related OBMC. Therefore, in the following, in order to reduce the computation complexity or memory bandwidth of BIO, several methods are proposed, when BIO and OBMC are enabled simultaneously.

In the JEM (Joint Exploration Model), the OBMC is also applied. In the JEM, unlike in H.263, OBMC can be switched on and off using syntax at the CU level. When OBMC is used in the JEM, the OBMC is performed for all motion compensation (MC) block boundaries except for the right and bottom boundaries of a CU. Moreover, it is applied for both the luma and chroma components. In the JEM, a MC block corresponds to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as illustrated in FIG. A-B.

Figure 4A:
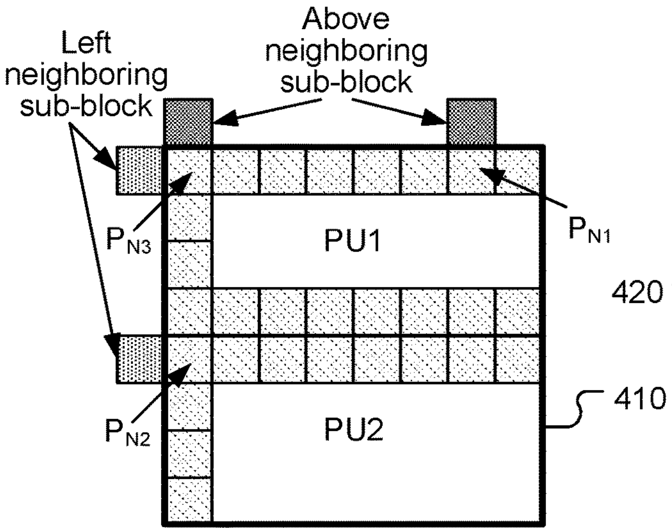
FIG. 4A illustrate an example of the sub-blocks that OBMC is applied, where the example includes subblocks at a CU/PU boundary.
Figure 4B:
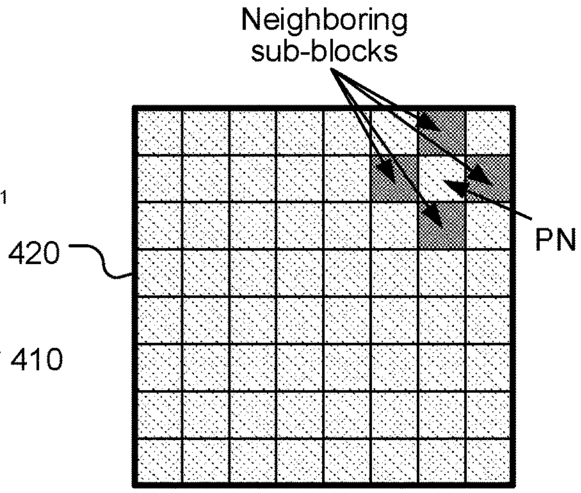
FIG. 4B illustrate an example of the sub-blocks that OBMC is applied, where the example includes subblocks coded in the AMVP mode.

When OBMC is applied to the current sub-block, besides current motion vectors, motion vectors of four connected neighboring sub-blocks, if available and are not identical to the current motion vector, are also used to derive the prediction block for the current sub-block. These multiple prediction blocks based on multiple motion vectors are combined to generate the final prediction signal of the current sub-block. Prediction block based on motion vectors of a neighboring sub-block is denoted as PN, with N indicating an index for the neighboring above, below, left and right sub-blocks and prediction block based on motion vectors of the current sub-block is denoted as PC. FIG. 4A illustrates an example of OBMC for sub-blocks of the current CU 410 using a neighboring above sub-block (i.e., $P_{N1}$), left neighboring sub-block (i.e., $P_{N2}$), left and above sub-blocks i.e., $P_{N3}$). FIG. 4B illustrates an example of OBMC for the ATMVP mode, where block PN uses MVs from four neighboring sub-blocks for OBMC. When PN is based on the motion information of a neighboring sub-block that contains the same motion information as the current sub-block, the OBMC is not performed from PN. Otherwise, every sample of PN is added to the same sample in PC, i.e., four rows/columns of PN are added to PC. The weighting factors {¼, ⅛, 1/16, 1/32} are used for PN and the weighting factors {3/4, 7/8, 15/16, 31/32} are used for PC. The exception are small MC blocks (i.e., when height or width of the coding block is equal to 4 or a CU is coded with sub-CU mode), for which only two rows/columns of PN are added to PC. In this case, weighting factors {1/4, 1/8} are used for PN and weighting factors {3/4, 7/8} are used for PC. For PN generated based on motion vectors of vertically (horizontally) neighboring sub-block, samples in the same row (column) of PN are added to PC with a same weighting factor.

In the JEM, for a CU with size less than or equal to 256 luma samples, a CU level flag is signaled to indicate whether OBMC is applied or not for the current CU. For the CUs with size larger than 256 luma samples or not coded with the AMVP mode, OBMC is applied by default. At the encoder, when OBMC is applied for a CU, its impact is taken into account during the motion estimation stage. The prediction signal formed by OBMC using motion information of the top neighboring block and the left neighboring block is used to compensate the top and left boundaries of the original signal of the current CU, and then the normal motion estimation process is applied.

Figure 5:
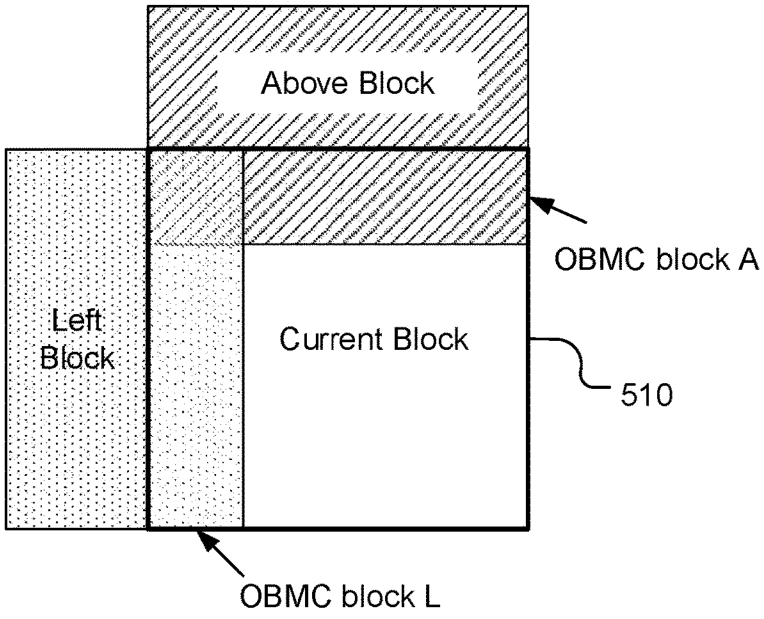
FIG. 5 illustrate an example of the OBMC processing using neighboring blocks from above and left for the current block.
Figure 6A:
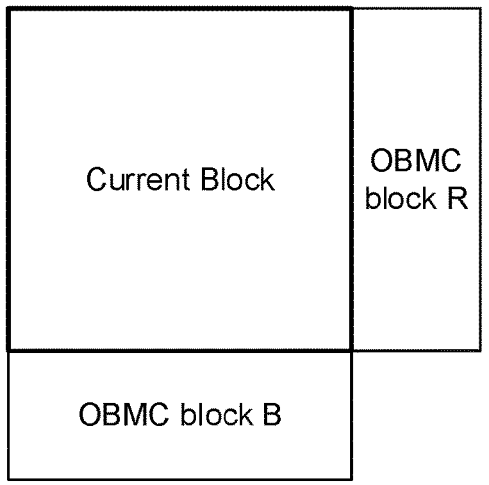
FIG. 6A illustrate an example of the OBMC processing for the right and bottom part of the current block using neighboring blocks from right and bottom.
Figure 6B:
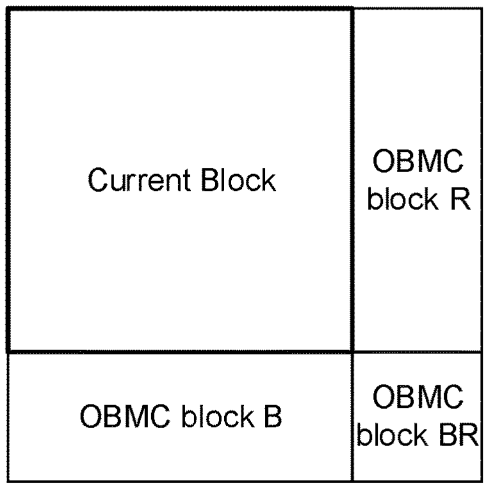
FIG. 6B illustrate an example of the OBMC processing for the right and bottom part of the current block using neighboring blocks from right, bottom and bottom-right.

In JEM (Joint Exploration Model for VVC development), the OBMC is applied. For example, as shown in FIG. 5, for a current block 510, if the above block and the left block are coded in an inter mode, it takes the MV of the above block to generate an OBMC block A and takes the MV of the left block to generate an OBMC block L. The predictors of OBMC block A and OBMC block L are blended with the current predictors. To reduce the memory bandwidth of OBMC, it is proposed to do the above 4-row MC and left 4-column MC with the neighboring blocks. For example, when doing the above block MC, 4 additional rows are fetched to generate a block of (above block+OBMC block A). The predictors of OBMC block A are stored in a buffer for coding the current block. When doing the left block MC, 4 additional columns are fetched to generate a block of (left block+OBMC block L). The predictors of OBMC block L are stored in a buffer for coding the current block. Therefore, when doing the MC of the current block, four additional rows and four additional columns of reference pixels are fetched to generate the predictors of the current block, the OBMC block B, and the OBMC block R as shown in FIG. 6A (may also generate the OBMC block BR as shown in FIG. 6B). The OBMC block B and the OBMC block R are stored in buffers for the OBMC process of the bottom neighboring blocks and the right neighboring blocks.

For an M×N block, if the MV is not integer and a 8-tap interpolation filter is applied, a reference block with size of (M+7)×(N+7) is used for motion compensation. However, if the BIO and OBMC is applied, additional reference pixels are required, which increases the worst case memory bandwidth.

There are two different schemes to implement OBMC.

In the first scheme, OBMC blocks are pre-generated when doing motion compensation for each block. These OBMC blocks will be stored in a local buffer for neighboring blocks. In the second scheme, the OBMC blocks are generated before the blending process of each block when doing OBMC.

In both schemes, several methods are proposed to reduce the computation complexity, especially for the interpolation filtering, and additional bandwidth requirement of OBMC.

Decoder Side Motion Vector Refinement (DMVR) in VVC

Figure 7:
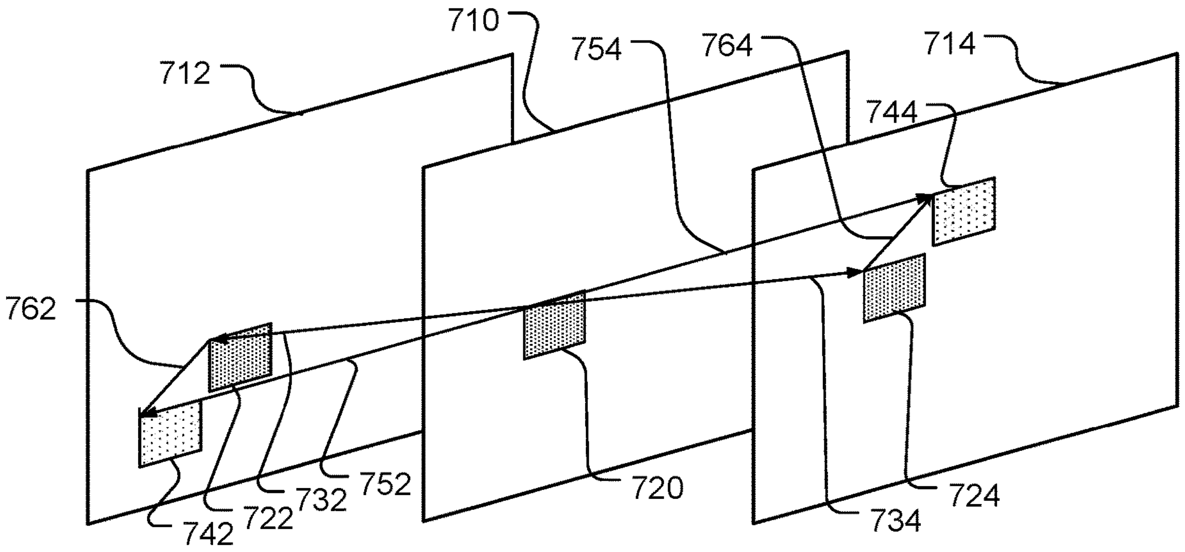
FIG. 7 illustrate an example of decoding side motion vector refinement.

In order to increase the accuracy of the MVs of the merge mode, a bilateral-matching (BM) based decoder side motion vector refinement is applied in VVC. In bi-prediction operation, a refined MV is searched around the initial MVs (732 and 734) in the reference picture list L0 712 and reference picture list L1 714 for a current block 720 the current picture 710. The collocated blocks 722 and 724 in L0 and L1 are determined according to the initial MVs 730 and 732) and the location of the current block 720 in the current picture as shown in FIG. 7. The BM method calculates the distortion between the two candidate blocks (742 and 744) in the reference picture list L0 and list L1. The locations of the two candidate blocks (742 and 744) are determined by adding two opposite offset (762 and 764) to the two initial MVs (732 and 734) to derive the two candidate MVs (752 and 754). As illustrated in FIG. 7, the SAD between the candidate blocks (742 and 744) based on each MV candidate around the initial MV (732 or 734) is calculated. The MV candidate (752 or 754) with the lowest SAD becomes the refined MV and used to generate the bi-predicted signal.

In VVC, the application of DMVR is restricted and is only applied for the CUs which are coded with following modes and features:

- CU level merge mode with bi-prediction MV
- One reference picture is in the past and another reference picture is in the future with respect to the current picture
- The distances (i.e. POC difference) from two reference pictures to the current picture are same
- Both reference pictures are short-term reference pictures
- CU has more than 64 luma samples
- Both CU height and CU width are larger than or equal to 8 luma samples
- BCW weight index indicates equal weight
- WP is not enabled for the current block
- CIIP mode is not used for the current block The refined MV derived by the DMVR process is used to generate the inter prediction samples and also used in temporal motion vector prediction for future pictures coding. While the original MV is used in the deblocking process and also used in spatial motion vector prediction for future CU coding.

The additional features of DMVR are mentioned in the following sub-clauses.

DMVR Searching Scheme

In DMVR, the search points are surrounding the initial MV and the MV offset obey the MV difference mirroring rule. In other words, any points that are checked by DMVR, denoted by candidate MV pair (MV0, MV1) obey the following two equations:

$$MV0' = MV0 + \text{MV\_offset}, \tag{1}$$

$$MV1' = MV1 - \text{MV\_offset}. \tag{2}$$

Where MV_offset represents the refinement offset between the initial MV and the refined MV in one of the reference pictures. The refinement search range is two integer luma samples from the initial MV. The searching includes the integer sample offset search stage and fractional sample refinement stage.

Twenty-five (25) points full search is applied for integer sample offset searching. The SAD of the initial MV pair is first calculated. If the SAD of the initial MV pair is smaller than a threshold, the integer sample stage of DMVR is terminated. Otherwise, SADs of the remaining 24 points are calculated and checked in the raster scanning order. The point with the smallest SAD is selected as the output of integer sample offset searching stage. To reduce the penalty of the uncertainty of DMVR refinement, it is proposed to favour the original MV during the DMVR process. The SAD between the reference blocks referred by the initial MV candidates is decreased by ¼ of the SAD value.

The integer sample search is followed by fractional sample refinement. To save the computational complexity, the fractional sample refinement is derived by using a parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x, y) = A(x - x_{min})^2 + B(y - y_{min})^2 + C, \tag{3}$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min} = (E(-1, 0) - E(1, 0))/(2(E(-1, 0) + E(1, 0) - 2E(0, 0))), \tag{4}$$

$$y_{min} = (E(0, -1) - E(0, 1))/(2((E(0, -1) + E(0, 1) - 2E(0, 0))). \tag{5}$$

The value of $x_{min}$ and $y_{min}$ are automatically constrained to be between −8 and 8 since all cost values are positive and the smallest value is E(0,0). This corresponds to half peal offset with 1/16th-pel MV accuracy in VVC. The computed fractional $(x_{min}, y_{min})$ are added to the integer distance refinement MV to get the sub-pixel accurate refinement delta MV.

Bilinear-Interpolation and Sample Padding

In VVC, the resolution of the MVs is 1/16 luma samples. The samples at the fractional position are interpolated using an 8-tap interpolation filter. In DMVR, the search points are surrounding the initial fractional-pel MV with an integer sample offset, therefore the samples of those fractional position need to be interpolated for the DMVR search process. To reduce the computational complexity, the bi-linear interpolation filter is used to generate the fractional samples for the searching process in DMVR. Another important effect is that by using bi-linear filter with a 2-sample search range, the DVMR does not access more reference samples compared to the normal motion compensation process. After the refined MV is obtained with the DMVR search process, the normal 8-tap interpolation filter is applied to generate the final prediction. In order not to access more reference samples than the normal MC process, the samples, which is not needed for the interpolation process based on the original MV but is needed for the interpolation process based on the refined MV, will be padded from those available samples.

When the width and/or height of a CU are larger than 16 luma samples, it will be further split into subblocks with width and/or height equal to 16 luma samples. The maximum unit size for DMVR searching process is limit to 16×16.

Affine Motion Compensated Prediction in VVC

Figure 8A:
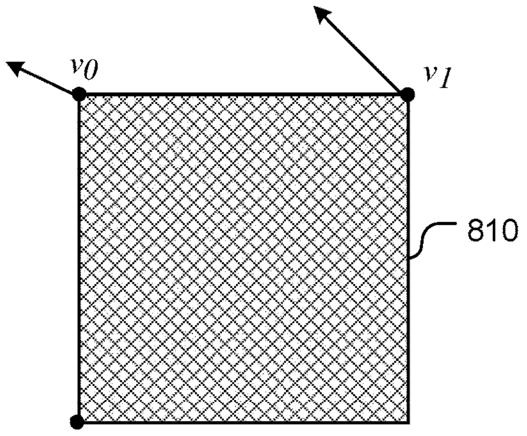
FIG. 8A illustrate an example of control points based a 4-parameter affine motion.
Figure 8B:
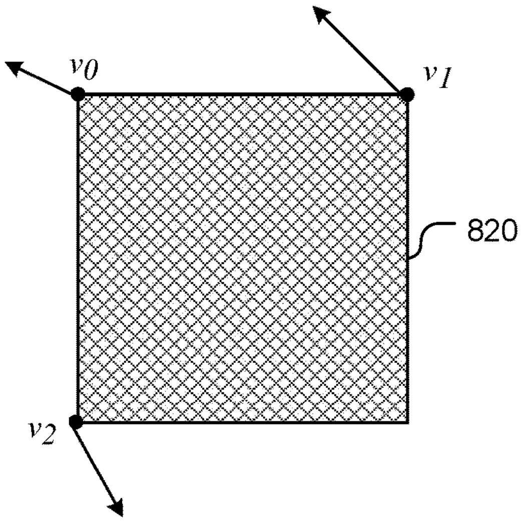
FIG. 8B illustrate an example of control points based a 6-parameter affine motion.

In HEVC, only translation motion model is applied for motion compensation prediction (MCP). While in the real world, there are many kinds of motion, e.g. zoom in/out, rotation, perspective motions and the other irregular motions. In VVC, a block-based affine transform motion compensation prediction is applied. As shown FIG. A-B, the affine motion field of the block is described by motion information of two control point (4-parameter) in FIG. 8A for the current block 810 or three control point motion vectors (6-parameter) in FIG. 8B for the current block 820.

For 4-parameter affine motion model, motion vector at sample location (x, y) in a block is derived as:

$$\begin{cases} mv_x = \dfrac{mv_{1x} - mv_{0x}}{W}x + \dfrac{mv_{0y} - mv_{1y}}{W}y + mv_{0x} \\ mv_y = \dfrac{mv_{1y} - mv_{0y}}{W}x + \dfrac{mv_{1x} - mv_{0x}}{W}y + mv_{0y} \end{cases}. \tag{6}$$

For 6-parameter affine motion model, motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases}. \tag{7}$$

Where $(mv_{0x}, mv_{0y})$ is the motion vector of the top-left corner control point, $(mv_{1x}, mv_{1y})$ is the motion vector of the top-right corner control point, and $(mv_{2x}, mv_{2y})$ is the motion vector of the bottom-left corner control point.

Figure 9:
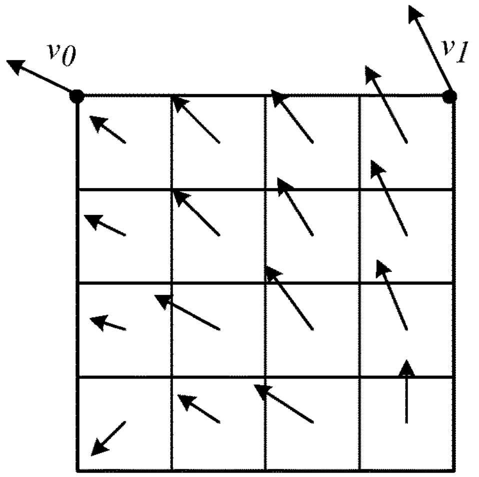
FIG. 9 illustrates an example of deriving motion vectors for 4×4 subblocks of the current block based on the affine motion model.

In order to simplify the motion compensation prediction, block based affine transform prediction is applied. To derive motion vector of each 4×4 luma subblock, the motion vector of the center sample of each subblock, as shown in FIG. 9, is calculated according to above equations, and rounded to 1/16 fraction accuracy. Then the motion compensation interpolation filters are applied to generate the prediction of each subblock with the derived motion vector. The subblock size of chroma-components is also set to be 4×4. The MV of a 4×4 chroma subblock is calculated as the average of the MVs of the top-left and bottom-right luma subblocks in the collocated 8×8 luma region.

As done for translational motion inter prediction, there are also two affine motion inter prediction modes: affine merge mode and affine AMVP mode.

Affine Merge Prediction

Figure 10:
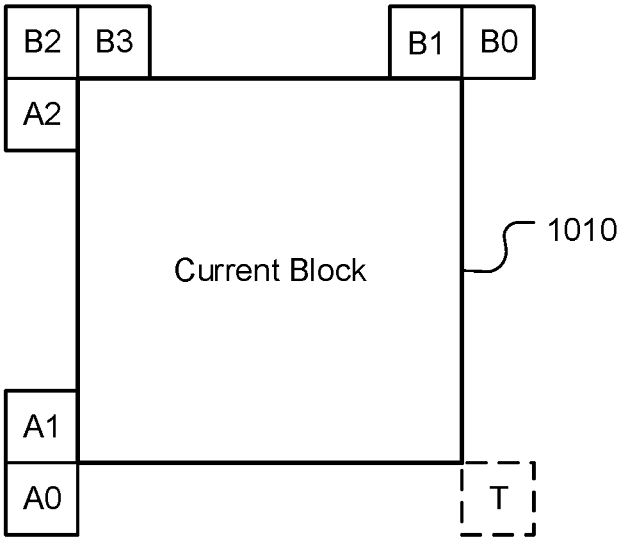
FIG. 10 illustrates an example of neighboring blocks for inheriting the motion information for affine model.
Figure 11:
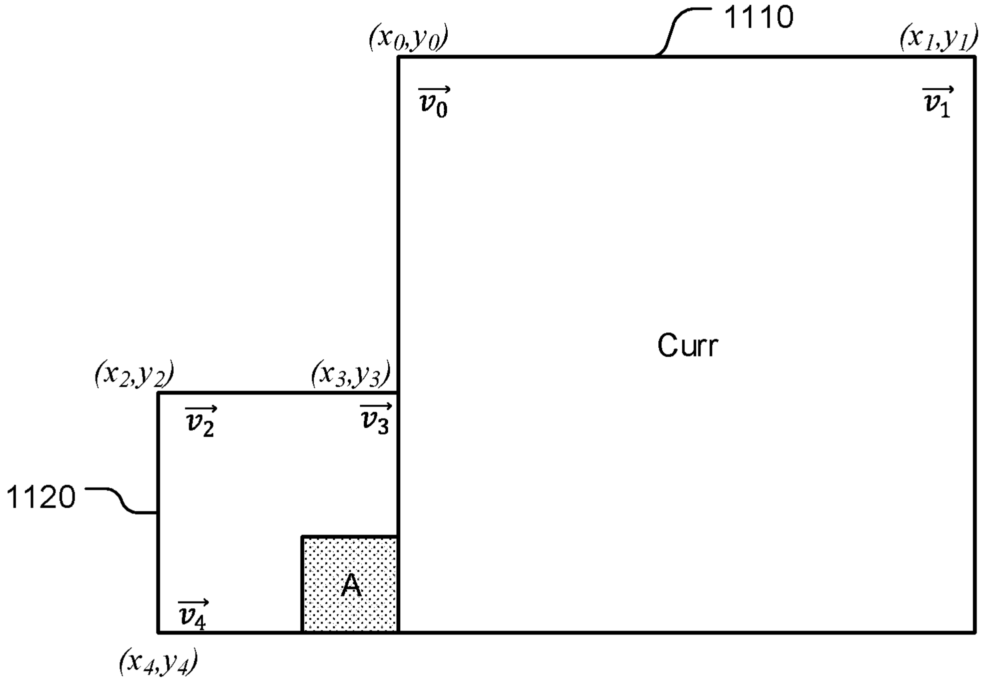
FIG. 11 illustrates an example of inheriting the motion information for affine model from a left subblock of the current block.

AF_MERGE (i.e., Affine Merge) mode can be applied for CUs with both width and height larger than or equal to 8. In this mode the CPMVs of the current CU is generated based on the motion information of the spatial neighboring CUs. There can be up to five CPMVP candidates and an index is signaled to indicate the one to be used for the current CU. The following three types of CPMV candidate are used to form the affine merge candidate list:

- Inherited affine merge candidates that are extrapolated from the CPMVs of the neighbor CUs
- Constructed affine merge candidates CPMVPs that are derived using the translational MVs of the neighbor CUs
- Zero MVs In VVC, there are two inherited affine candidates at most, which are derived from the affine motion model of the neighboring blocks, one from left neighboring CUs and one from above neighboring CUs. The candidate blocks are shown in FIG. 10. For the left predictor, the scan order is A0→A1, and for the above predictor, the scan order is B0→B1→B2. Only the first inherited candidate from each side is selected. No pruning check is performed between two inherited candidates. When a neighboring affine CU is identified, its control point motion vectors are used to derived the CPMVP candidate in the affine merge list of the current CU. As shown in FIG. 11, if the neighbor left bottom block A of the current CU 1110 is coded in the affine mode, the motion vectors $v_2$, $v_3$ and $v_4$ of the top left corner, above right corner and left bottom corner of the CU 1120 which contains the block A are attained. When block A is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

Figure 12:
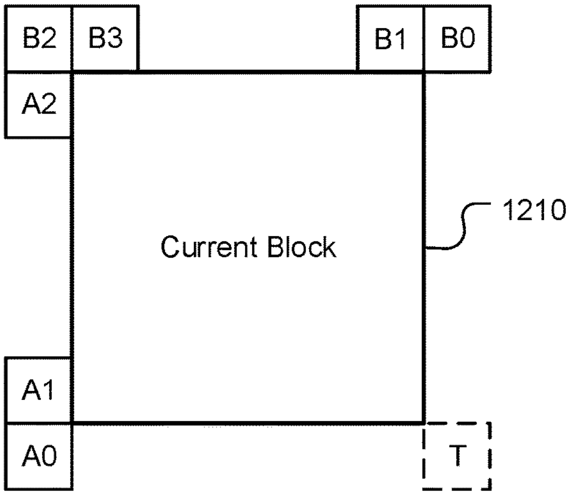
FIG. 12 illustrates an example of constructed affine candidate by combining the neighbor translational motion information of each control point.

Constructed affine candidate means the candidate is constructed by combining the neighbor translational motion information of each control point. The motion information for the control points is derived from the specified spatial neighbors and temporal neighbor of a current block 1210 as shown in FIG. 12. $CPMV_k$ (k=1, 2, 3, 4) represents the k-th control point. For $CPMV_1$, the order of B2→B3→A2 blocks are checked and the MV of the first available block is used. For $CPMV_2$, the order of B1→B0 blocks are checked and for $CPMV_3$, the order of A1→A0 blocks are checked. For TMVP is used as $CPMV_4$ if it is available.

After MVs of four control points are attained, affine merge candidates are constructed based on the motion information of these control points. The following combinations of control point MVs are used to construct in order:

{$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}

The combination of three CPMVs constructs a 6-parameter affine merge candidate and the combination of two CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

Affine AMVP Prediction

Affine AMVP mode can be applied to CUs with both width and height larger than or equal to 16. An affine flag in CU level is signaled in the bitstream to indicate whether affine AMVP mode is used and then another flag is signaled to indicate whether 4-parameter affine or 6-parameter affine. In this mode, the difference of the CPMVs of current CU and their predictors CPMVPs is signaled in the bitstream. The affine AVMP candidate list size is 2 and it is generated by using the following four types of CPMV candidate in order:

- Inherited affine AMVP candidates that extrapolated from the CPMVs of the neighbor CUs
- Constructed affine AMVP candidates CPMVPs that are derived using the translational MVs of the neighbor CUs
- Translational MVs from neighboring CUs
- Zero MVs The checking order of inherited affine AMVP candidates is same to the checking order of inherited affine merge candidates. The only difference is that, for AVMP candidate, only the affine CU that has the same reference picture as in current block is considered. No pruning process is applied when inserting an inherited affine motion predictor into the candidate list.

Constructed AMVP candidate is derived from the specified spatial neighbors shown in FIG. 12. The same checking order is used as done in affine merge candidate construction. In addition, reference picture index of the neighboring block is also checked. The first block in the checking order that is inter coded and has the same reference picture as in current CUs is used. There is only one. When the current CU is coded with 4-parameter affine mode, and $mv_0$ and $mv_1$ are both available, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If affine AMVP list candidates is still less than 2 after valid inherited affine AMVP candidates and constructed AMVP candidate are inserted, $mv_0$, $mv_1$ and $mv_2$ will be added, in order, as the translational MVs to predict all control point MVs of the current CU, when available. Finally, zero MVs are used to fill the affine AMVP list if it is still not full.

Affine Motion Information Storage

In VVC, the CPMVs of affine CUs are stored in a separate buffer. The stored CPMVs are only used to generate the inherited CPMVPs in the affine merge mode and affine AMVP mode for the lately coded CUs. The subblock MVs derived from CPMVs are used for motion compensation, MV derivation of merge/AMVP list of translational MVs and de-blocking.

Figure 13:
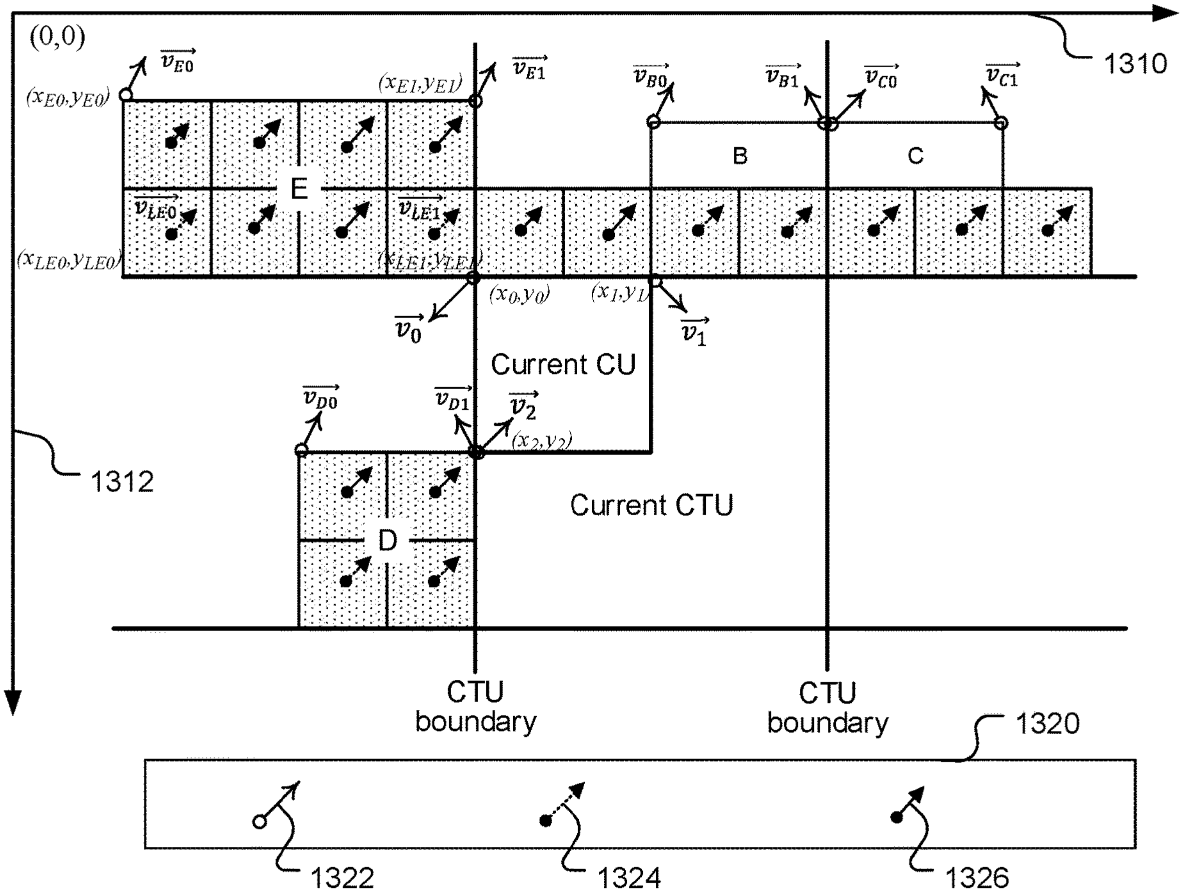
FIG. 13 illustrates an example of motion vector usage for constructed affine candidate by combining the neighbor translational motion information of each control point.

To avoid the picture line buffer for the additional CPMVs, affine motion data inheritance from the CUs of the above CTU is treated differently for the inheritance from the normal neighboring CUs. If the candidate CU for affine motion data inheritance is in the above CTU line, the bottom-left and bottom-right subblock MVs in the line buffer instead of the CPMVs are used for the affine MVP derivation. In this way, the CPMVs are only stored in a local buffer. If the candidate CU is 6-parameter affine coded, the affine model is degraded to 4-parameter model. As shown in FIG. 13 along the top CTU boundary, the bottom-left and bottom right subblock motion vectors of a CU are used for affine inheritance of the CUs in bottom CTUs. In FIG. 13, line 1310 and line 1312 indicate the x and y coordinates of the picture with the origin (0,0) at the upper left corner. Legend 1320 shows the meaning of various motion vectors, where arrow 1322 represents the CPMVs for affine inheritance in the local buff, arrow 1324 represents sub-block vectors for MC/merge/skip/AMVP/deblocking/TMVPs in the local buffer and for affine inheritance in the line buffer, and arrow 1326 represents sub-block vectors for MC/merge/skip/AMVP/deblocking/TMVPs.

Prediction Refinement with Optical Flow for Affine Mode

Subblock based affine motion compensation can save memory access bandwidth and reduce computation complexity compared to pixel based motion compensation, at the cost of prediction accuracy penalty. To achieve a finer granularity of motion compensation, prediction refinement with optical flow (PROF) is used to refine the subblock based affine motion compensated prediction without increasing the memory access bandwidth for motion compensation. In VVC, after the subblock based affine motion compensation is performed, luma prediction sample is refined by adding a difference derived by the optical flow equation. The PROF is described as following four steps:

Step 1) The subblock-based affine motion compensation is performed to generate subblock prediction I(i,j).

Step 2) The spatial gradients $g_x(i,j)$ and $g_y(i,j)$ of the subblock prediction are calculated at each sample location using a 3-tap filter [−1, 0, 1]. The gradient calculation is exactly the same as gradient calculation in BDOF.

$$g_x(i,j) = (I(i+1,j) \gg \text{shift1}) - (I(i-1,j) \gg \text{shift1}) \quad (8)$$

$$g_y(i,j) = (I(i,j+1) \gg \text{shift1}) - (I(i,j-1) \gg \text{shift1}) \quad (9)$$

In the above equations, shift1 is used to control the gradient's precision. The subblock (i.e. 4×4) prediction is extended by one sample on each side for the gradient calculation. To avoid additional memory bandwidth and additional interpolation computation, those extended samples on the extended borders are copied from the nearest integer pixel position in the reference picture.

Figure 14:
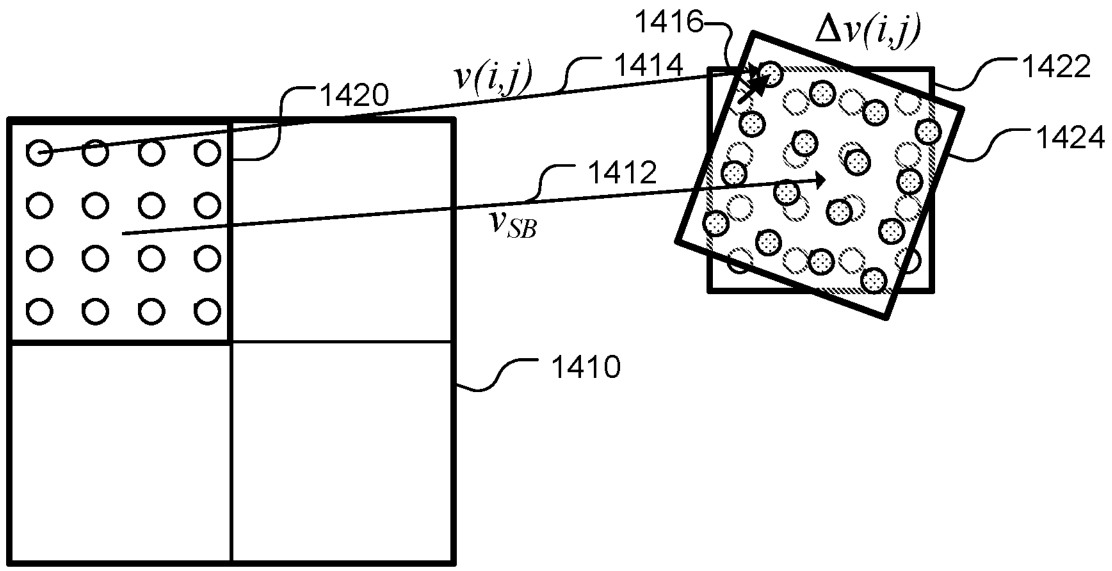
FIG. 14 illustrates an example of prediction refinement with optical flow for the affine mode.

Step 3) The luma prediction refinement is calculated by the following optical flow equation.

$$\Delta I(i,j) = g_x(i,j) * \Delta v_x(i,j) + g_y(i,j) * \Delta v_y(i,j) \quad (10)$$

where the Δv(i,j) is the difference between sample MV computed for sample location (i,j), denoted by v(i,j), and the subblock MV of the subblock to which sample (i,j) belongs, as shown in FIG. 14. The Δv(i,j) is quantized in the unit of 1/32 luma sample precision. In FIG. 14, sub-block 1422 corresponds to a reference sub-block for sub-block 1420 as pointed by the motion vector $V_{SB}$ (1412). The reference sub-block 1422 represents a reference sub-block resulted from translational motion of block 1420. Reference sub-block 1424 corresponds to a reference sub-block with PROF. The motion vector for each pixel is refined by Δv(i,j). For example, the refined motion vector v(i,j) 1414 for the top-left pixel of the sub-block 1420 is derived based on the sub-block MV $V_{SB}$(1412) modified by Δv(i,j) 1416.

Since the affine model parameters and the sample location relative to the subblock center are not changed from subblock to subblock, Δv(i,j) can be calculated for the first subblock, and reused for other subblocks in the same CU. Let dx(i,j) and dy(i,j) be the horizontal and vertical offsets from the sample location (i,j) to the center of the subblock $(x_{SB}, y_{SB})$, Δv(x,y) can be derived by the following equation, $$\begin{cases} dx(i,j) = i - x_{SB} \\ dy(i,j) = j - y_{SB} \end{cases} \quad (11)$$

$$\begin{cases} \Delta v_x(i,j) = C * dx(i,j) + D * dy(i,j) \\ \Delta v_y(i,j) = E * dx(i,j) + F * dy(i,j) \end{cases} \quad (12)$$

In order to keep accuracy, the enter of the subblock $(x_{SB}, y_{SB})$ is calculated as $((W_{SB}-1)/2, (H_{SB}-1)/2)$, where $W_{SB}$ and $H_{SB}$ are the subblock width and height, respectively.

For 4-parameter affine model, $$\begin{cases} C = F = \dfrac{v_{1x} - v_{0x}}{w} \\ E = -D = \dfrac{v_{1y} - v_{0y}}{w} \end{cases} \quad (13)$$

For 6-parameter affine model, $$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases} \quad (14)$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

The fourth step of PROF is as following:

Step 4) Finally, the luma prediction refinement ΔI(i,j) is added to the subblock prediction I(i,j). The final prediction I' is generated as the following equation:

$$I'(i,j) = I(i,j) + \Delta I(i,j) \quad (15)$$

PROF is not applied in two cases for an affine coded CU: 1) all control point MVs are the same, which indicates the CU only has translational motion; 2) the affine motion parameters are greater than a specified limit because the subblock based affine MC is degraded to CU based MC to avoid large memory access bandwidth requirement.

A fast encoding method is applied to reduce the encoding complexity of affine motion estimation with PROF. PROF is not applied at affine motion estimation stage in following two situations: a) if this CU is not the root block and its parent block does not select the affine mode as its best mode, PROF is not applied since the possibility for current CU to select the affine mode as best mode is low; and b) if the magnitude of four affine parameters (C, D, E, F) are all smaller than a predefined threshold and the current picture is not a low delay picture, PROF is not applied because the improvement introduced by PROF is small for this case. In this way, the affine motion estimation with PROF can be accelerated.

Subblock-Based Temporal Motion Vector Prediction (SbTMVP) in VVC

VVC supports the subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTMVP. SbTMVP differs from TMVP in the following two main aspects:

TMVP predicts motion at CU level but SbTMVP predicts motion at sub-CU level;

Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 15A:
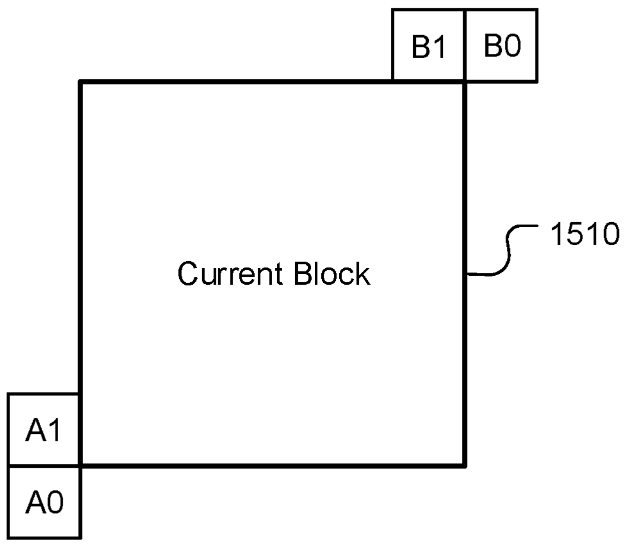
FIG. 15A illustrates an example of subblock-based Temporal Motion Vector Prediction (SbTMVP) in VVC, where the spatial neighboring blocks are checked for availability of motion information.
Figure 15B:
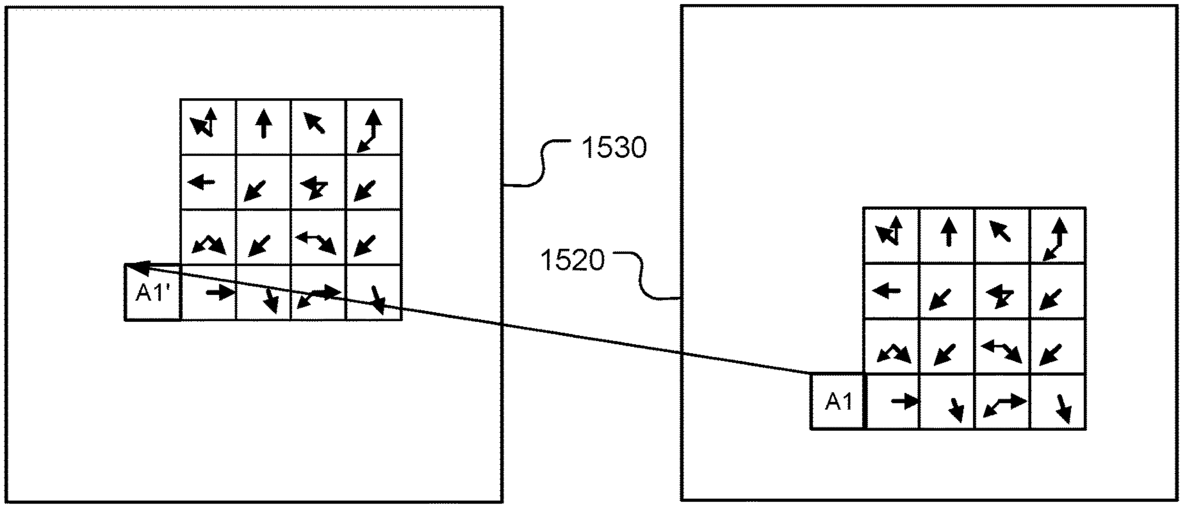
FIG. 15B illustrates an example of SbTMVP for deriving sub-CU motion field by applying a motion shift from spatial neighbor and scaling the motion information from the corresponding collocated sub-CUs.

The SbTMVP process is illustrated in FIGS. 15A-B. SbTMVP predicts the motion vectors of the sub-CUs within the current CU in two steps. In the first step, the spatial neighbor A1 in FIG. 15A is examined. If A1 has a motion vector that uses the collocated picture as its reference picture, this motion vector is selected to be the motion shift to be applied. If no such motion is identified, then the motion shift is set to (0, 0).

In the second step, the motion shift identified in Step 1 is applied (i.e. added to the current block's coordinates) to obtain sub-CU level motion information (motion vectors and reference indices) from the collocated picture as shown in FIG. 15B. The example in FIG. 15B assumes the motion shift is set to block A1's motion, where frame 1520 corresponds to the current picture and frame 1530 corresponds to a reference picture (i.e., a collocated picture). Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU. In FIG. 15B, the arrow(s) in each subblock of the collocated picture 1530 correspond(s) to the motion vector(s) of a collocated subblock (thick-lined arrow for L0 MV and thin-lined arrow for L1 MV). For the current picture 1520, the arrow(s) in each subblock correspond(s) to the scaled motion vector(s) of a current subblock (thick-lined arrow for L0 MV and thin-lined arrow for L1 MV).

In VVC, a combined subblock based merge list, which contains both SbTMVP candidate and affine merge candidates, is used for the signaling of subblock based merge mode. The SbTMVP mode is enabled/disabled by a sequence parameter set (SPS) flag. If the SbTMVP mode is enabled, the SbTMVP predictor is added as the first entry of the list of subblock based merge candidates, and followed by the affine merge candidates. The size of subblock based merge list is signaled in SPS and the maximum allowed size of the subblock based merge list is 5 in VVC.

The sub-CU size used in SbTMVP is fixed to be 8×8, and as done for the affine merge mode, SbTMVP mode is only applicable to the CU with both width and height are larger than or equal to 8.

The encoding processing flow of the additional SbTMVP merge candidate is the same as for the other merge candidates, that is, for each CU in P or B slice, an additional RD check is performed to decide whether to use the SbTMVP candidate.

The motion unit in different coding tools is different. For example, in affine is 4×4 subblock and in multi-pass DMVR is 8×8 subblock. Subblock-boundary OBMC uses different motions to do MC to refine each subblock predictor so as to reduce discontinuity/blocking artefact in subblock boundary. However, in current Enhanced Compression Model (ECM) for international video coding standard development beyond the VVC, subblock-boundary OBMC treats all motion units as 4×4 subblock size in the affine mode and in the multi-pass DMVR mode. Therefore, subblock-boundary OBMC may not treat the subblock boundary properly. This issue may also exist in other prediction coding tools supporting subblock processing.

A new adaptive OBMC subblock size method is proposed. In this method, when OBMC is applied to the current block, the OBMC subblock size may be changed according to information related to the inter prediction tool selected for the current block (for example, its current block prediction information, current block mode information, current block size, current block shape or any other information related to the inter prediction tool selected for the current block), information related to the inter prediction tool of a neighboring block (for example, neighboring block information, neighboring block size, neighboring block shape or any other information related to the inter prediction tool of a neighboring block), cost metrics, or any combination of them. The OBMC subblock size can be matched to the smallest (or finest) motion changing unit in different prediction modes, or it can always be the same OBMC subblock size regardless of different prediction mode. The motion changing unit is also referred as the motion processing unit.

In one embodiment, when current block is coded in the DMVR mode, the OBMC subblock size is set to be M1×N1 (M1 and N1 being non-negative integers) for luma, depending on the smallest motion changing unit in the DMVR mode. For example, the OBMC subblock size for the DMVR mode can be set to 8×8 while the OBMC subblock size for other coding modes is always set to M2×N2 (M2 and N2 being non-negative integers) for luma. For example, the OBMC subblock size can be 4×4 for other modes.

In another embodiment, when the current block is coded in the affine mode, the OBMC subblock size is set to be M1×N1 (M1 and N1 being non-negative integers) for luma, depending on the smallest motion changing unit in the affine mode. For example, the OBMC subblock size for the affine mode can be set to 4×4, while the OBMC subblock size for other modes is always set to M2×N2 (M2 and N2 being non-negative integers) for luma. For example, the OBMC subblock size can be 4×4 or 8×8 for other coding modes.

In another embodiment, when the current block is coded in the SbTMVP mode, the OBMC subblock size is set to be M1×N1 (M1 and N1 being non-negative integers) for luma, depending on the smallest motion changing unit in the SbTMVP mode. For example, the OBMC subblock size for the SbTMVP mode can be set to 4×4, while the OBMC subblock size for other modes is always set to M2×N2 (M2 and N2 being non-negative integers) for luma. For example, the OBMC subblock size can be 4×4 or 8×8 for other coding modes.

In another embodiment, when current block is coded in prediction modes that will refine motion in the subblock level, the OBMC subblock size is set to be motion changing subblock size for luma, depending on the smallest motion changing unit in each prediction mode. For example, the 8×8 OBMC subblock size can be used for the current block coded in the DMVR mode, and the 4×4 OBMC subblock size can be used for the current block coded in the affine mode or SbTMVP mode.

In another embodiment, when the current block is coded in a Geometric Prediction Mode (GPM) or partitioned in a geometric shape, the OBMC subblock size is set to be motion changing subblock size for luma, depending on the smallest motion changing unit in its prediction mode shape or its partition shape.

In another embodiment, when the neighboring block is coded in prediction modes that will refine motion in the subblock level, for to current block to be applied OBMC, the OBMC subblock size for the current block is set to be motion changing subblock size for luma, depending on the smallest motion changing unit in each prediction mode from neighboring blocks or from the current block. For example, 8×8 OBMC subblock size is used for blocks coded in the DMVR mode, 4×4 OBMC subblock size for blocks coded in the affine mode or SbTMVP mode.

In another embodiment, when a neighboring block is coded in a Geometric Prediction Mode (GPM) or partitioned in a geometric shape that its motion can be in geometric region, the OBMC subblock size for the current block is set to be the motion changing subblock size in luma, depending on the smallest motion changing unit in each prediction mode from a neighboring block or from the current block. For example, 8×8 OBMC subblock size is used for blocks coded in the DMVR mode, 4×4 OBMC subblock size is used for blocks coded in the affine mode or SbTMVP mode.

In another embodiment, when OBMC is applied to the current block, it may use neighboring reconstruction samples to calculate the cost to decide the OBMC subblock size. For example, the template matching method or bilateral matching method can be used to calculate the cost and determine the smallest motion changing unit accordingly.

In another embodiment, when OBMC is applied to the current block, the template matching is performed for each subblock to calculate the cost between the reconstruction samples and reference samples of the subblock above or left of the current subblock. If the cost is smaller than a threshold, the OBMC subblock size is enlarged since the motion similarity is high. Otherwise (i.e., the cost being larger than the threshold), OBMC subblock size is kept unchanged since the neighboring motion and current motion is not similar.

Figure 1A:
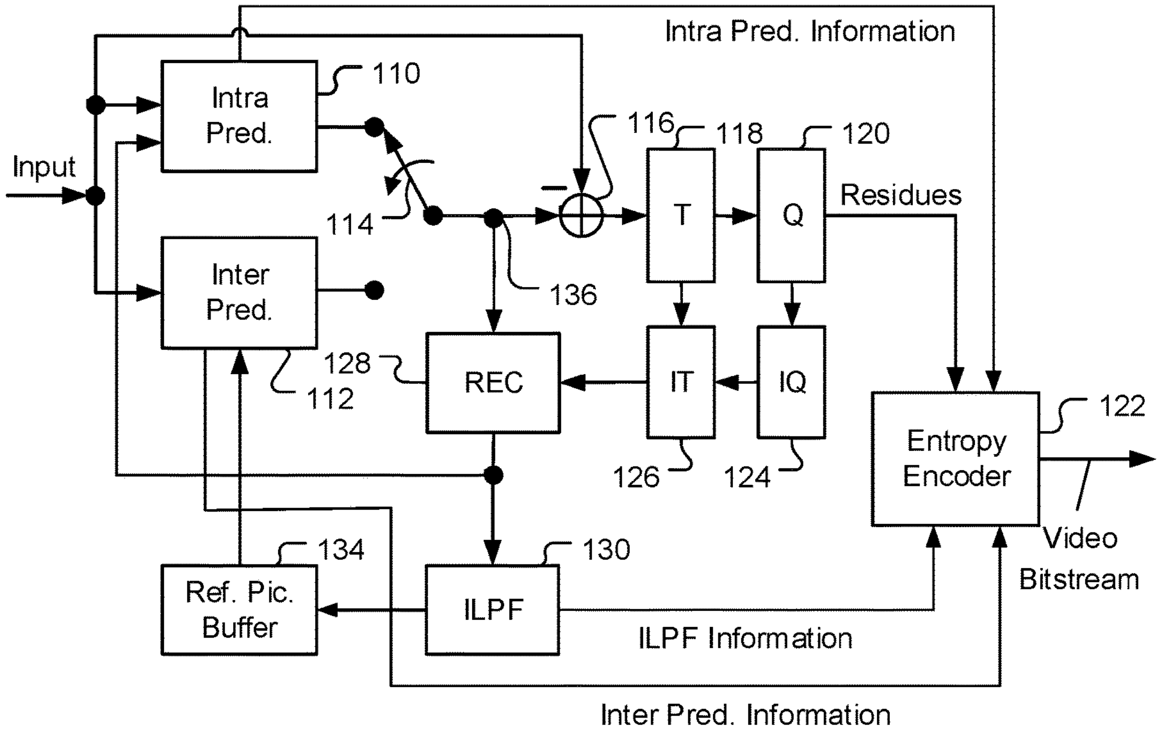
Fig. 1A (Prior Art)
FIG. 1A illustrates an exemplary adaptive Inter/Intra video encoding system incorporating loop processing.
Figure 1B:
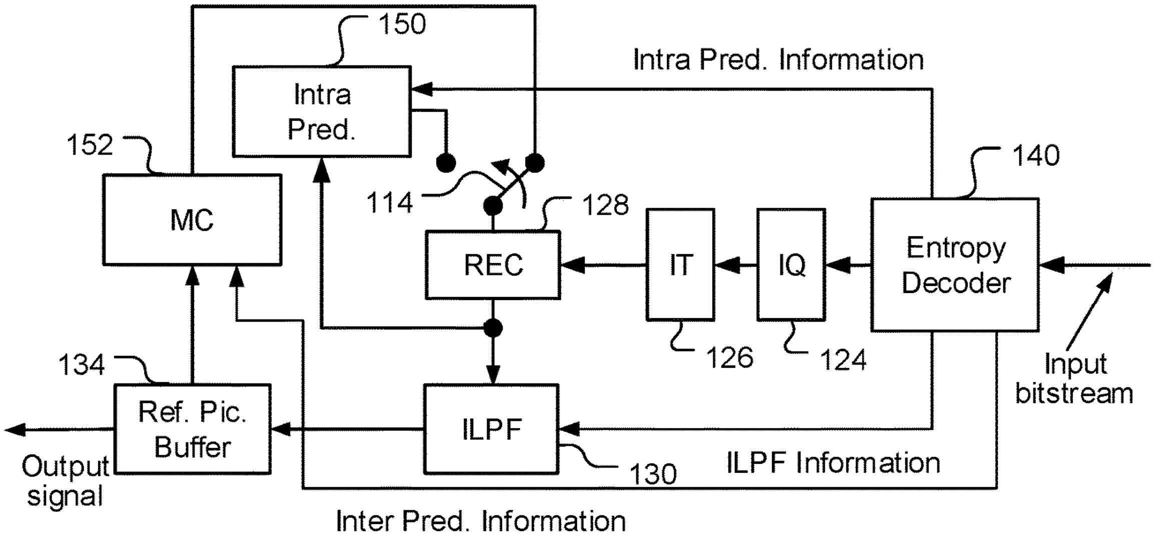
Fig. 1B (Prior Art)
FIG. 1B illustrates a corresponding decoder for the encoder in FIG. 1A.

Any of the foregoing proposed methods can be implemented in encoders and/or decoders. For example, in the encoder side, the required OBMC and related processing can be implemented in a predictor derivation module, such as part of the Inter-Pred. unit 112 as shown in FIG. 1A. However, the encoder may also use additional processing unit to implement the required processing. For the decoder side, the required OBMC and related processing can be implemented in a predictor derivation module, such as part of the MC unit 152 as shown in FIG. 1B. However, the decoder may also use additional processing unit to implement the required processing. While the Inter-Pred. 112 and MC 152 are shown as individual processing units, they may correspond to executable software or firmware codes stored on a media, such as hard disk or flash memory, for a CPU (Central Processing Unit) or programmable devices (e.g. DSP (Digital Signal Processor) or FPGA (Field Programmable Gate Array)). Alternatively, any of the proposed methods can be implemented as a circuit coupled to the predictor derivation module of the encoder and/or the predictor derivation module of the decoder, so as to provide the information needed by the predictor derivation module.

Figure 16:
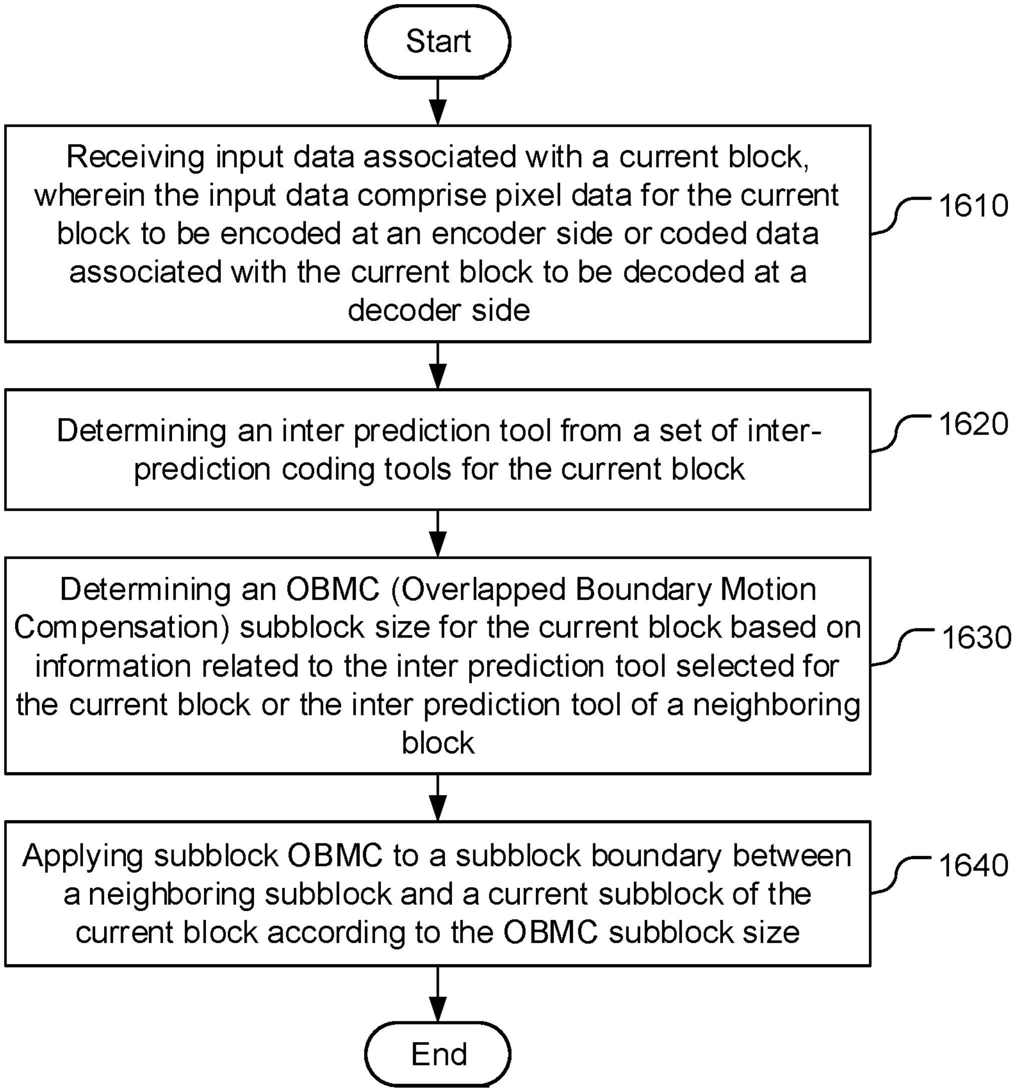
FIG. 16 illustrates a flowchart of an exemplary Overlapped Block Motion Compensation (OBMC) process in a video coding system according to an embodiment of the present invention.

FIG. 16 illustrates a flowchart of an exemplary Overlapped Block Motion Compensation (OBMC) process in a video coding system according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to the method, input data associated with a current block is received in step 1610, wherein the input data comprise pixel data for the current block to be encoded at an encoder side or coded data associated with the current block to be decoded at a decoder side. An inter prediction tool from a set of inter-prediction coding tools is determined for the current block in step 1620. An OBMC (Overlapped Boundary Motion Compensation) subblock size for the current block is determined based on information related to the inter prediction tool selected for the current block or the inter prediction tool of a neighboring block in step 1630. Subblock OBMC (Overlapped Boundary Motion Compensation) is applied to a subblock boundary between a neighboring subblock and a current subblock of the current block according to the OBMC subblock size in step 1640.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:

receiving input data associated with a current block, wherein the input data comprise pixel data for the current block to be encoded at an encoder side or coded data associated with the current block to be decoded at a decoder side;

determining an inter prediction tool from a set of inter-prediction coding tools for the current block;

determining an OBMC (Overlapped Boundary Motion Compensation) subblock size for the current block based on information, wherein the information comprises any one of current block size, current block shape, neighboring block information, neighboring block size, neighboring block shape, or cost metrics; and applying subblock OBMC to a subblock boundary between a neighboring subblock and a current subblock of the current block according to the OBMC subblock size.

2. The method of claim 1, wherein the OBMC subblock size is dependent on a smallest processing unit associated with the inter prediction tool selected for the current block.

3. The method of claim 2, wherein the inter prediction tool selected for the current block corresponds to a DMVR mode (Decoder Side Motion Vector Refinement).

4. The method of claim 2, wherein the OBMC subblock size is set to 8×8 if the inter prediction tool selected for the current block corresponds to a DMVR mode (Decoder Side Motion Vector Refinement), and the OBMC subblock size is set to 4×4 if the inter prediction tool selected for the current block corresponds to an inter prediction tool other than the DMVR mode.

5. The method of claim 2, wherein the inter prediction tool selected for the current block corresponds to an affine mode.

6. The method of claim 2, wherein the OBMC subblock size is set to 4×4 if the inter prediction tool selected for the current block corresponds to an affine mode, and the OBMC subblock size is set to include side 8×8 if the inter prediction tool selected for the current block corresponds to an inter prediction tool other than the affine mode.

7. The method of claim 2, wherein the inter prediction tool selected for the current block corresponds to an SbTMVP (Subblock-based Temporal Motion Vector Prediction) mode.

8. The method of claim 2, wherein the OBMC subblock size is set to 4×4 if the inter prediction tool selected for the current block corresponds to an SbTMVP (Subblock-based Temporal Motion Vector Prediction) mode, and the OBMC subblock size is set to include size 8×8 if the inter prediction tool selected for the current block corresponds to an inter prediction tool other than the SbTMVP.

9. The method of claim 2, wherein the OBMC subblock size is set to 8×8 if the inter prediction tool selected for the current block corresponds to a DMVR mode (Decoder Side Motion Vector Refinement), and the OBMC subblock size is set to 4×4 if the inter prediction tool selected for the current block corresponds to an affine more or an SbTMVP (Subblock-based Temporal Motion Vector Prediction) mode.

10. The method of claim 2, wherein the inter prediction tool selected for the current block corresponds to a GPM (Geometric Partition Mode).

11. An apparatus for video coding, the apparatus comprising one or more electronics or processors arranged to:

receive input data associated with a current block, wherein the input data comprise pixel data for the current block to be encoded at an encoder side or coded data associated with the current block to be decoded at a decoder side;

determine an inter prediction tool from a set of inter-prediction coding tools for the current block;

determine an OBMC (Overlapped Boundary Motion Compensation) subblock size for the current block based on information, wherein the information comprises any one of current block size, current block shape, neighboring block information, neighboring block size, neighboring block shape, or cost metrics; and apply subblock OBMC to a subblock boundary between a neighboring subblock and a current subblock of the current block according to the OBMC subblock size.

* * * * *